United States Patent [19]

Claret et al.

[11] 3,778,167

[45] Dec. 11, 1973

[54] OPTICAL MONITORING SYSTEM

[75] Inventors: Rene Claret, Sceaux; Jean Francois Picard, Versailles, both of France

[73] Assignee: Societe d'Applications Generales d'Electricite et de Mecanique SAGEM, Paris, France

[22] Filed: Oct. 1, 1971

[21] Appl. No.: 185,776

[30] Foreign Application Priority Data
Dec. 17, 1970 France.............................. 7045542

[52] U.S. Cl. ........... 356/167, 356/237, 250/219 DF
[51] Int. Cl. .......................................... G01b 11/00
[58] Field of Search ............................ 356/156, 167; 250/219 DF

[56] References Cited
UNITED STATES PATENTS

| 3,670,153 | 6/1972 | Rempert et al............... 250/219 DF |
| 3,558,900 | 1/1971 | Moskowitz.................... 250/219 DF |
| 3,448,279 | 6/1969 | Lindemann et al........... 250/219 DF |
| 3,455,622 | 7/1969 | Cooper........................... 350/96 B |
| 3,502,415 | 3/1970 | Hock ............................... 356/167 |

*Primary Examiner*—David Schonberg
*Assistant Examiner*—Conrad Clark
*Attorney*—Larson, Taylor & Hinds

[57] ABSTRACT

A support is arranged to bear the part to be measured or checked and an optical device illuminates the part by diascopy or by episcopy by a parallel beam of light. The light source is the output end of a light guide placed at the focus of the optical device. At the distant input end is a light generator. A photoelectric receiver collects the beam of light emerging from the optical device after it has illuminated the part by diascopy or by episcopy. Relative displacement between the support and the optical device-receiver device assembly, is effected in a transverse direction with respect to the light beam. A pulse generator is actuated by this movement and delivers a number of electrical pulses proportional to the amplitude of the movement. A pulse counter receives the pulses from the pulse generator, through an electronic gate actuated by a signal from the receiver.

12 Claims, 5 Drawing Figures

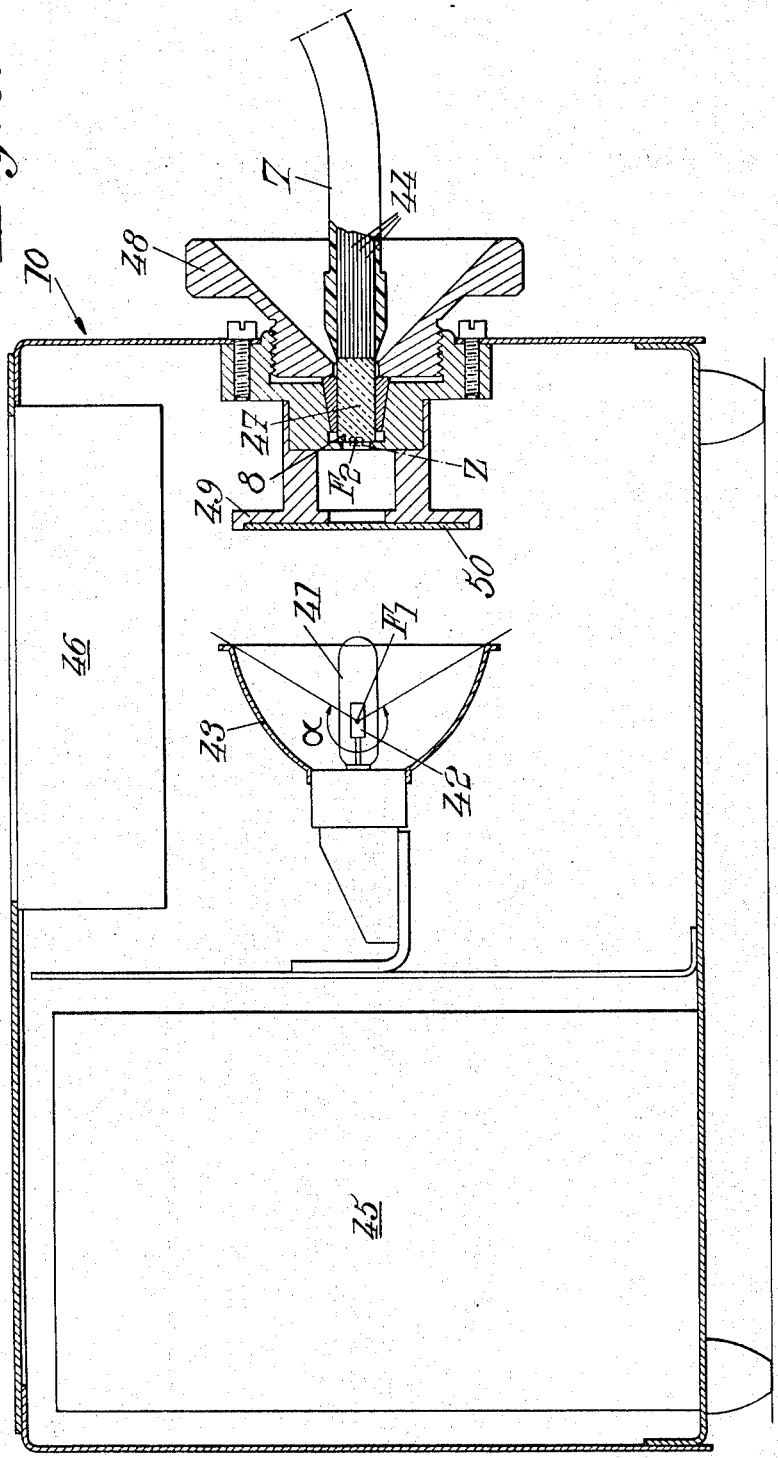

OPTICAL MONITORING SYSTEM

The invention relates to optical apparatus and methods for measuring or checking parts, especially parts of small dimensions (of the order of a millimeter), such as parts in watchmaking.

The apparatuses comprise mechanical means and optical means arranged so that, by relative displacement between the abovesaid mechanical means and the abovesaid optical means, the part to be measured or checked masks or unmasks the light beam delivered by optical means (diascopy), or the part to be measured or checked causes a reflection with a variation in contrast of the said light beam (episcopy).

Similarly, these methods are based on the masking and the unmasking of a beam of light by the part to be measured or checked (diascopy) or on reflection of the said light beam with variation of contrast between two portions of the part to be measured or checked (episcopy).

Hitherto, such apparatus and methods relied on the observation of an operator to detect the masking and the unmasking of the light beam or the variation in contrast of the said light beam. There resulted therefrom a human error factor, variable from one operator to the next, and even variable in time with the degree of fatigue of the same operator.

Moreover, these apparatuses and these methods relied on light sources cooperating with optical devices, such as a lamp situated at the focus of an optical device; the light beam emitted was then a more or less or parallel radiation taking into account the aberrations of the optical device and the relatively large dimensions and irregular geometry of the filament of the lamp.

In addition, this optical device having to have a large aperture, its focus was close and there was an impossibility of providing a powerful lamp since the heat energy released would have rapidly caused deterioration, even breakage, of the constituent element of the optical device.

Finally, this heat energy was liable to reach the part to be measured or checked and to modify its sides.

It will be appreciated then that all these drawbacks (human error, faulty parallelism of the light beam, limiting power of illumination, troublesome effects of the heat energy released by the lamp), rendered apparatus and methods known hitherto subject in use to poor accuracy, reliability and fidelity.

It is an object of the invention to provide an apparatus and a method in which human error is eliminated.

It is another object of the invention to provide an apparatus and a method in which the parallelism of the light beam is improved.

It is a further object of the invention to provide an apparatus and a method in which the illuminating power can be increased without inconvenience.

It is yet another object of the invention to provide an apparatus and a method with a cold light source, which eliminates the risks of modification of the sides of the parts in the course of measurement or checking.

The apparatus according to the invention comprises in combination, a support on which the part to be measured or checked is arranged, an optical device arranged with respect to this part to illuminate it diascopically or episcopically by a beam of parallel light emitted by a light source placed at the focus of the said optical device and constituted by the output end of a light guide of which the input end cooperates with a light generator spaced from the part to be measured or checked, a receiving device with a photoelectric element arranged so as to collect a portion at least of the light beam emerging from the optical device after the said light beam has illuminated, diascopically or episcopically, the part to be meausred or checked, drive means to cause a movement of a relative displacement between the support and the optical device-receiver device assembly, the displacement being effected in a transverse direction (preferably perpendicular) with respect to the portion of the light beam neighboring the part to be measured or checked, at least one pulse generator actuated by this movement and delivering a number of electrical pulses proportional to the amplitude of the movement, and a pulse counter receiving the pulses delivered by the pulse generator through an electronic gate actuated by a signal delivered by the receiving device with the photoelectric element.

The method according to the invention is characterised by the combination of the following steps:

the part to be measured or checked is arranged on a support, this part is illuminated diascopically or episcopically by a beam of light emerging from a cold light source, this beam of light being then collected at least in part in a receiver device with a photoelectric element, a movement of relative displacement between the support and the beam of light is caused in a transverse direction (preferably perpendicular) with respect to the portion of the said light beam neighboring the part to be measured or checked, by this movement at least one pulse generator delivering a number of electrical pulses proportional to the amplitude of the movement is actuated, and these pulses are directed onto a pulse counter through an electronic gate actuated by a signal delivered by the receiving device with the photoelectric element.

According to a preferred embodiment of this method recourse is had, to produce the cold light, to a light generator illuminating the input end of a light guide of which the output end is arranged at the focus of an optical device.

In order that the invention may be more fully understood, several embodiments of the invention are described below purely by way of illustrative but nonlimiting example, with reference to the accompanying drawings in which:

FIG. 5 is a section on a larger scale of an important element of an apparatus according to the invention.

Figure 1:
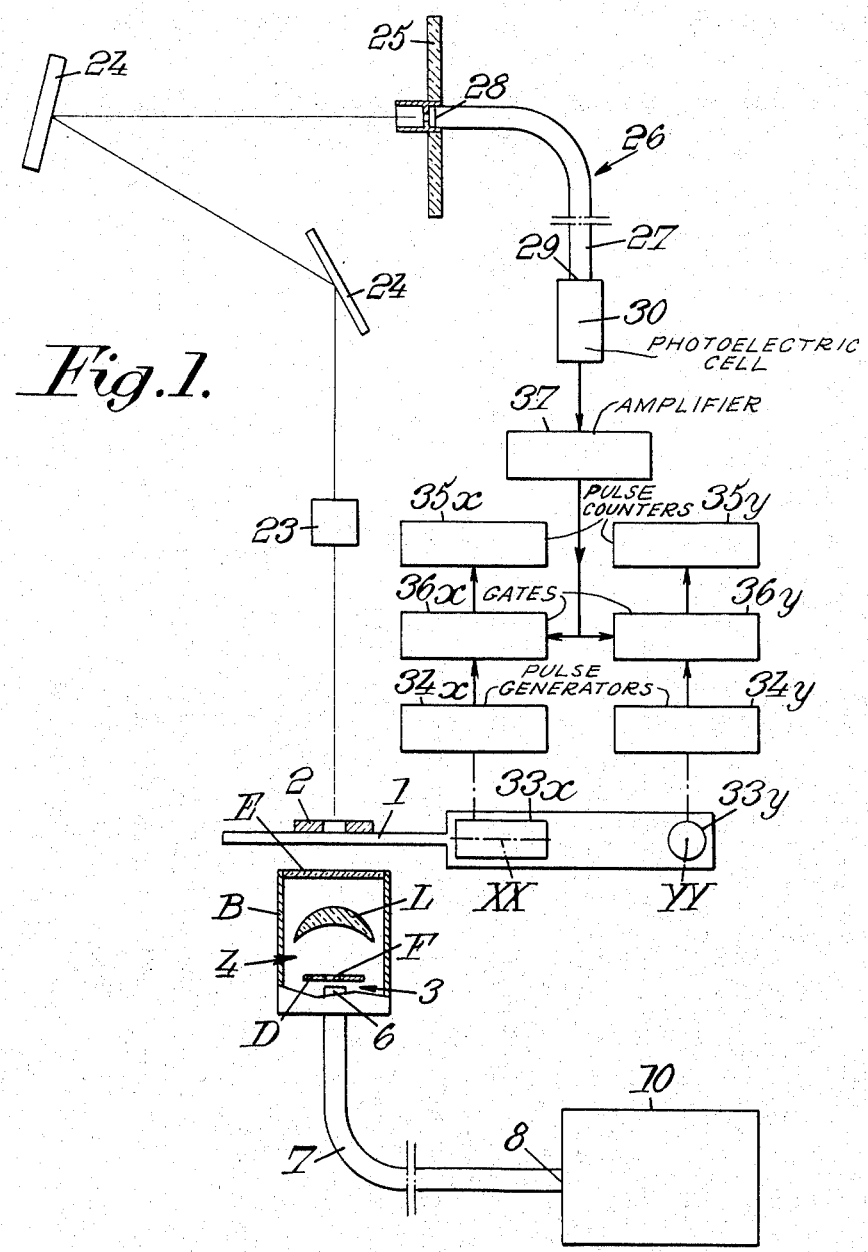
FIG. 1 is a diagrammatic view of one embodiment of an apparatus constructed according to the invention and operating by diascopy.

The apparatus shown in FIG. 1 is of a type where the part to be measured or checked 2 is illuminated by diascopy.

This part 2 is arranged on a support 1 which is transparent at least in its portion on which the said part 2 is arranged.

Figure 2:
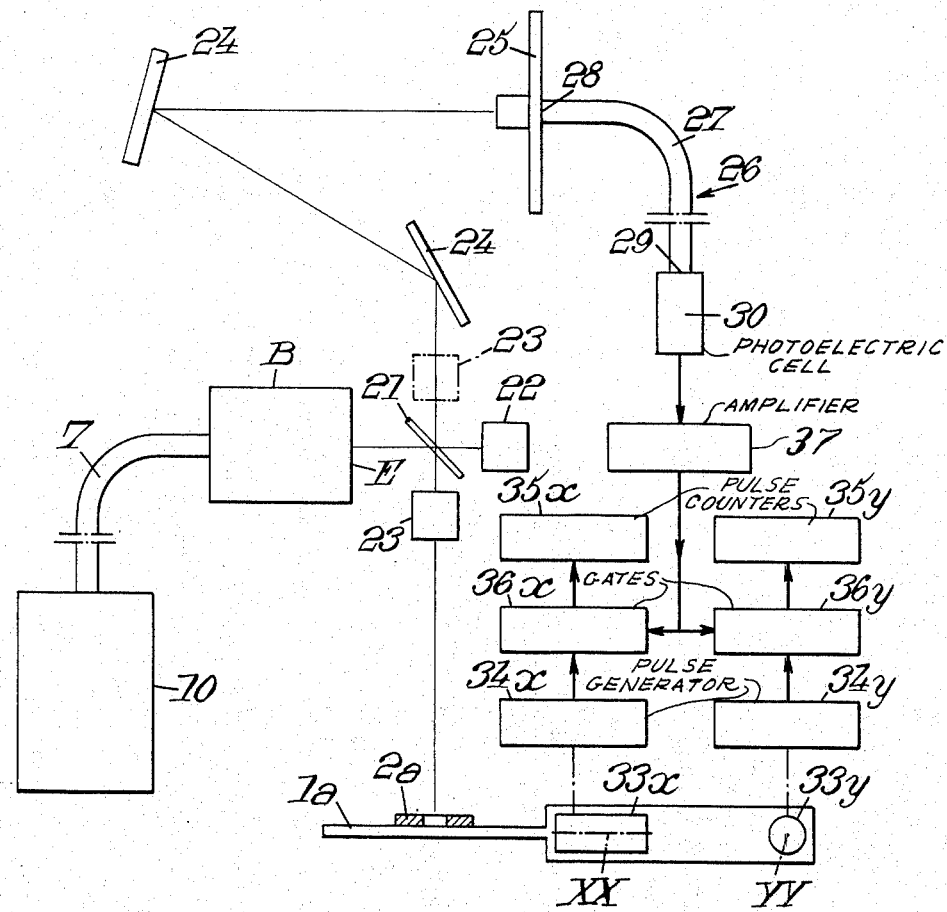
FIG. 2 is a diagrammatic view of another embodiment of an apparatus according to the invention and operating by episcopy.

The apparatus shown in FIG. 2 is of a type where the part to be measured or checked 2a is illuminated by episcopy.

This part 2a is arranged on the support 1a which can be opaque.

An opaque device 4 is arranged with respect to this part 2 or 2a to illuminate by a beam of parallel light by diascopy through the support 1 (FIG. 1), or by episcopy above the support 1a with interposition of a semitransparent plate 21 behind which is arranged a light trap 22 (FIG. 2).

This optical device 4 can be shielded in a casing B closed, on the side where the beam of parallel light emerges, by a filter screen E.

As shown in detail in FIG. 1, the beam of parallel light is emitted by a light source 3 placed at the focus F of the optical device 4 and constituted by the output end 6 of a light guide 7 of which the input end 8 cooperates with a light generator 10 sufficiently spaced from the part to be measured or checked 2 or 2a for the heat energy released by the said light generator 10 to run no risk of reaching the said part.

Advantageously and to reduce the dimensions of the output end 6 of the light guide 7, there is provided a diaphragm D; by way of example, it may be indicated that this output end 6 can have a diameter of 3 mm, and that the diameter of the diaphragm D can be selected as equal to 1 mm.

Under these conditions, there is hence obtained a light source 3 of much more reduced dimensions than the dimensions of a conventional filament which, for an equal light intensity, would have the shape of a rectangle of 5mm × 10mm.

As for the optical device 4 proper, advantage is taken of the "cold" character of the light source 3 to constitute by a concave-convex lens L, with a spherical concave surface and a paraboloidic convex surface, the output end 6 of the light guide 7 being arranged at the focus F of the thus-constituted lens L.

Due to the use of such a lens L, practically all spherical aberrations are eliminated; it should also be pointed out that with such a lens L it would be impossible to constitute the light source 3 by a conventional lamp on account of the closeness of this lamp and of the very enveloping character of the lens L.

From the optical point of view, the apparatus comprises also an enlarging optical system 23, one or several return mirrors 24 and an observation screen 25 on which the image of the part to be measured or checked 2 or 2a is formed.

In the case of illumination by diascopy, the optical enlarging system 23 is arranged between the part 2 and the first return mirror 24 (FIG. 1).

In the case of illumination by episcopy, the optical enlarging system 23 is arranged between the part 2a and the first return mirror 24, upstream or downstream of the semitransparent plate 21.

As shown in FIGS. 1 and 2, the apparatus comprises in addition a receiving device with a photoelectric element 26 arranged so as to collect the portion at least of the beam of light emerging from the optical device 4 after the said beam of light has illuminated by diascopy or by episcopy the part to be measured or checked 2 or 2a.

This receiving device with a photoelectric element 26 can be constituted, as shown in FIGS. 1 and 2, by a light guide 27 of which the input end 28 starts from a central zone of the observation screen 25, and of which the output end 29 cooperates with a photoelectric element, such as a photoelectric cell 30.

Figure 4:
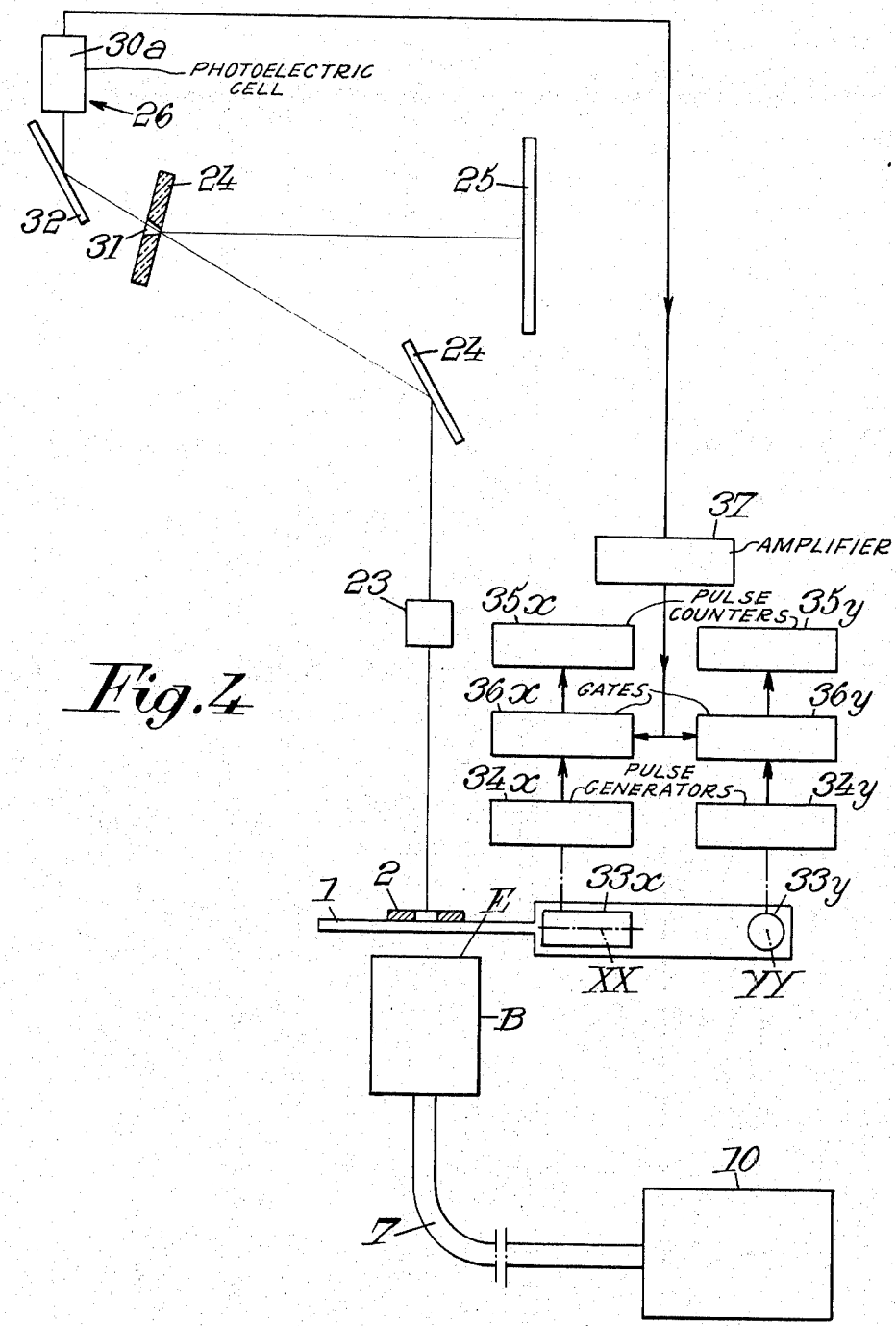
FIG. 4 shows, by a diagrammatic view, an apparatus of the same type as that of FIG. 1, but constructed according to a variation; and finally.

However this receiving device with a photoelectric element 26 could be constituted, as shown in FIG. 4, on which the same reference numerals denote the same members as in FIG. 1, by a photoelectric element, such as a photoelectric cell 30a arranged behind one of the return mirrors 24 in which an orifice 31 is arranged allowing a fraction of the beam of light to pass; a return mirror 32 can be interposed between this orifice 31 and the photoelectric cell 30a.

This being the case, the apparatus is made to include also, as shown in FIGS. 1 and 2, drive means $33_x$ and $33_y$ to cause a movement or displacement of the support 1 or 1a with respect to the optical device 4 and receiver device 26 assembly, which assembly remains fixed; this displacement is effected along two rectangular axes XX and YY perpendicular to the portion of the beam of light which is illuminating the part to be measured or checked 2 or 2a.

Two pulse generators $34_x$ and $34_y$ are actuated respectively (directly or indirectly) by movements of displacement along the axes XX and YY, each of these pulse generators $34_x$ and $34_y$ delivering a number of electrical pulses proportional to the amplitude of the movement along the axis XX or YY concerned.

Two pulse counters $35_x$ and $35_y$ receive the pulses delivered respectively by the pulse counters $34_x$ and $34_y$ through two bistable electronic gates $36_x$ and $36_y$ actuated by a signal delivered by the receiver device with a photoelectric element 26.

This signal is preferably amplified in an amplifying cell 37 interposed between the abovesaid receiver device with a photoelectric element 26 and the two gates $36_x$ and $36_y$.

The description of these drive means and of these electronic means which has just been made with regard to FIGS. 1 and 2 could be applied with regard to FIG. 4, in which the same reference numerals denote the same members as in FIGS. 1 and 2.

Figure 3:
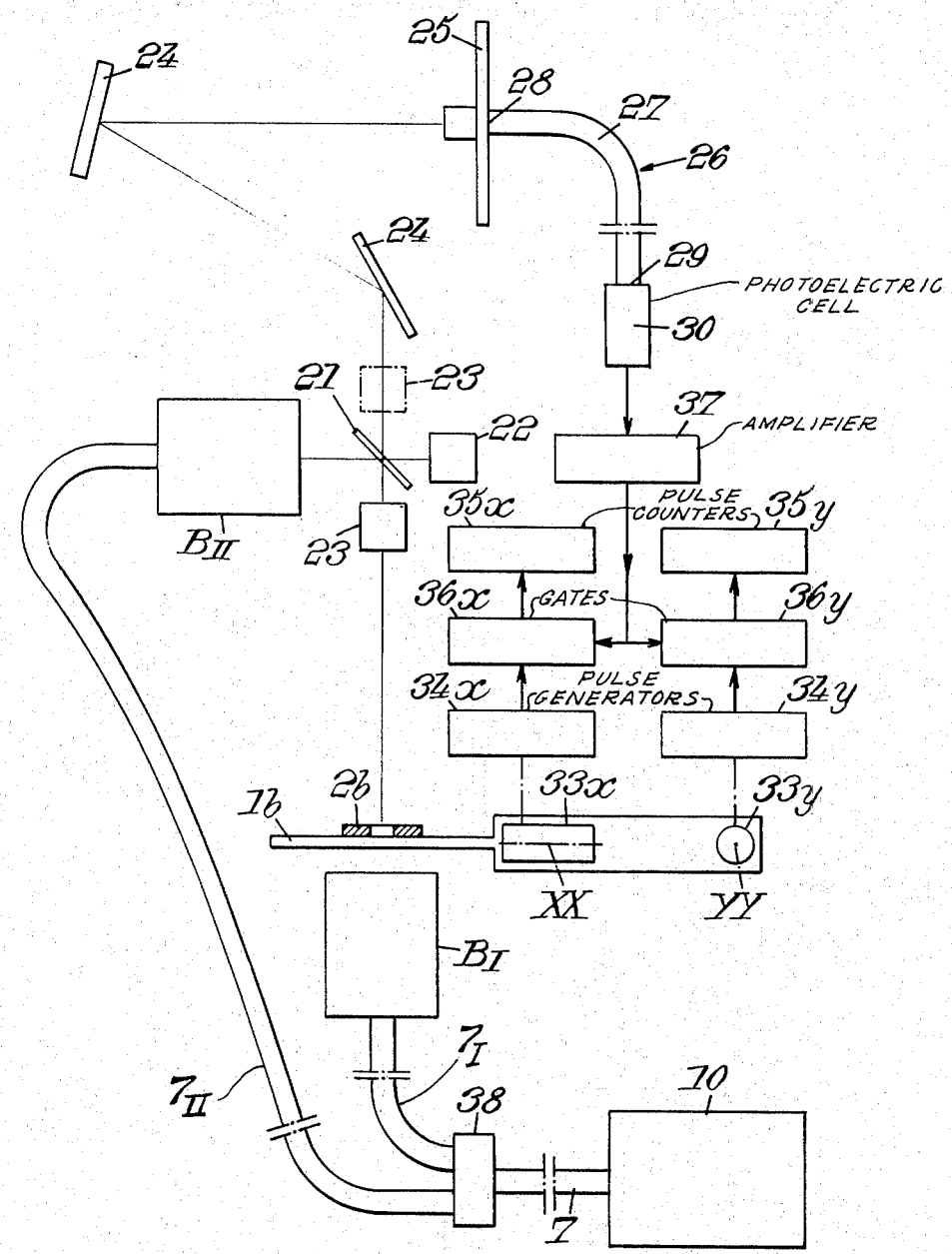
FIG. 3 is a diagrammatic view of another embodiment of an apparatus constructed according to the invention and capable of operating by diascopy or by episcopy.

The apparatus shown in FIG. 3 is of a type where the part to be measured or checked 2b can be illuminated by diascopy or by episcopy.

This part 2b is arranged on a support 1b which is transparent at least in its portion on which the said part 2b is arranged.

The apparatus then comprises two optical devices, analogous to that described with regard to FIG. 1, shielded in two closed cases denoted by the reference numerals $B_I$ and $B_{II}$ and arranged respectively so as to illuminate the part 2b by a beam of parallel light by diascopy through the support 1b, and by episcopy above the support 1b.

From the optical point of view, from the point of view of the drive means and from the point of view of the electronic means, this apparatus comprises the same elements as those described with reference to FIGS. 1 and 2.

The optical devices of the cases $B_I$ and $B_{II}$ are connected to a single light generator 10 by means of the light guide 7 which is divided into two arms $7_I$ and $7_{II}$ ending respectively at the optical devices $B_I$ and $B_{II}$, this division being effected in an optical fibers divider 38.

Advantageously the light generator 10, shown in detail in FIG. 5, comprises the lamp 41, generally a halogen lamp, the filament 42 of this lamp being arranged at the near focus $F_1$ of an elliptical reflector 43 constituting a condensor optical device which directs by reflection the luminous radiation emitted by the filament 42 onto a focussing zone Z situated at the distant focus $F_2$ of the elliptical reflector 43.

The light guide 7 is then arranged so that its input end 8 occurs at the level of the focussing zone Z.

Preferably, the elliptical reflector 43 is arranged to allow the infrared radiation to pass and to reflect only the visible radiation.

To eliminate the infrared radiation which can also drive at the input end 8 of the light guide 7, there is provided at the said input end a heat shielding filter 47 made rigid, advantageously by adhesive, to the front section of the elemental optical fibers 44 constituting the said light guide 7.

This heat shielding filter 47 is constituted by a cylinder of glass of the same diameter as the light guide 7.

This assembly is advantageously shielded in a casing which also shields transformer 45 to supply low voltage to the lamp 41 and to a blower 46 to remove the heat coming from the filament 42 and from the heat shielding filter 47.

A connecting mechanism, for example by a threaded part 48, enables to be held, in dismountable manner, the end of the heat shielding filter 47, which end constitutes the input end of the light guide 7, at the level of the focussing zone Z.

Between the focussing zone Z and the lamp 41-reflector 43 assembly, there is provided a support 49 intended to receive a complementary heat rejecting filter 50 constituted by a plate of glass of a diameter greater than that of the light guide 7 (diameter around 4 times greater).

Due to this arrangement, the infrared radiation which could penetrate into the light guide 7 provided with its heat shielding filter 47 can be further reduced. It is also possible to use a light guide of which the input is not provided with a heat shielding filter, only the complementary heat shielding filter 50 reducing the amount of the infrared radiation which penetrates into the light guide 7.

In FIG. 5, there is shown the angle of total aperture $\alpha$ which defines the solid angle corresponding to the fraction of the luminous radiation emitted by the filament 42 and which is received by the elliptical reflector 43. This angle is about 250°. With respect to an aperture angle of 50°, the increase in the fraction of the light radiation received by the elliptical reflector is around 22 times.

Finally, the apparatus and the method according to the invention have a certain number of advantages among which may be mentioned the following points:

the measurement or the checking of the part 2, 2a or 2b is effected independently of the operator since it is the masking and demasking, or the variation in contrast, of the beam of light which determines the beginning and the end of the pulse counting, that is to say the beginning and the end of the measurement or of the checking;

the role of the operator is limited to the positioning of the part 2, 2a or 2b on the support 1, 1a or 1b, to the orientation of the part with respect to the said support, to the selection of the movement to be imparted to the abovesaid support and, in episcopic illumination, to the identification of the portion of the part causing the variation in contrast; in any case, the positioning of the part is facilitated by the tracing of two lines on the observation screen 25, which tracing can also be completed by a tracing of the profile of the part;

the observations that the operator must make on this observation screen 25 are facilitated by the small bulk of the receiver device 26, or the housing of this receiver 26 behind the observation screen 25;

the output end 6 of the light guide 7 constitutes a "cold source", which eliminates the troublesome effects of release of heat energy in the neighborhood of the optical device 4 and in the neighborhood of the part to be measured or checked;

the output end 6 of the light guide 7 constitutes a light source of dimensions less than the dimensions of a lamp filament, and it is also possible to diaphragm this output end;

the output end 6 of the light guide 7, diaphragmed or not, constitutes a perfectly circular source which can be arranged with precision coaxially with the optical device; as a result the light emitted by the output end 6 of the light guide 7 has a high percentage of coherence, which can reach 50 percent;

due to the heat shielding filter 47, possibly completed by the complementary heat shielding filter 50, the luminous radiation emerging from the light guide 7 is a "cold luminous radiation";

finally, the arrangement of the heat shielding filter 47 glued to the front section of the elementary optical fibers 44 of the light guide 7 protects the input of the said light guide 7 and enables the deterioration of the ends of the elementary optical fibers 44 to be avoided.

We claim:

1. Optical apparatus for measuring or checking an object, comprising in combination:

a support arranged to bear an object to be measured or checked;

an optical device arranged to illuminate said object by diascopy or eipscopy with a parallel beam of light;

a receiver device comprising a photoelectric element arranged so as to collect at least part of said beam of light emerging from the optical device after said beam of light has illuminated said object by diascopy or by episcopy said receiver device including means for generating a signal responsive to light emanating from the illuminated object;

drive means uncontrolled by other elements of the apparatus for causing a relative displacement between said support and said beam of light, said relative displacement being effected in a transverse direction with respect to the portion of the beam of light illuminating said part;

at least one pulse generator actuated by said relative displacement and delivering a number of electrical pulses proportional to the relative displacement amplitude;

and at least one pulse counter receiving said electrical pulses through an electronic gate opened and closed by the signal generated by said receiver device when its photoelectric element is actuated by light emanating from the illuminated object.

2. Optical apparatus according to claim 1, wherein the optical device comprises a lens and a light source, said light source comprising a light generator located a distance from the object to be measured or checked and a light guide, the input end of which is adjacent said generator and the output end of which is positioned at the focus of said lens.

3. Apparatus according to claim 2, wherein a diaphragm is disposed at the output end of the light guide.

4. Apparatus according to claim 3, wherein said lens comprises a concavo-convex lens with a spherical concave surface and a paraboloidic convex surface.

5. Apparatus according to claim 1, including an enlarging optical system for forming an enlarged image of the illuminated object and an observation screen on which the enlarged image of the object is formed.

6. Apparatus according to claim 5, including means for illuminating the object by episcopy, comprising a semi-transparent plate behind which a light trap is arranged, the enlarging optical system being arranged upstream of the said semi-transparent plate.

7. Apparatus according to claim 5, including means for illuminating the object by episcopy, comprising a semi-transparent plate behind which a light trap is arranged, the optical enlarging device being arranged downstream of said semi-transparent plate.

8. Apparatus according to claim 5, wherein the receiver device comprises a photoelectric cell and a light guide of which the input end starts from a central zone of the observation screen and of which the output end cooperates with said photoelectric cell.

9. Apparatus according to claim 5, wherein the receiver device comprises a photoelectric cell arranged behind a return mirror, and an orifice is arranged to allow a fraction of the beam of light to pass through.

10. Apparatus according to claim 1, wherein an amplifying cell is interposed between the photoelectric element and the electronic gate.

11. Apparatus according to claim 2, arranged to be able to illuminate the object by diascopy or by episcopy, comprising a single light generator connected to two optical devices shielded respectively in cases by means of a light guide which is divided into two arms in an optical fiber divider, said two cases being arranged respectively so as to illuminate the object by a parallel beam of light by diascopy through the support, and by episcopy above the support.

12. Method for measuring or checking an object, comprising the following steps:
arranging the object to be measured or checked on a support,
illuminating said object by diascopy or by episcopy by a beam of light and then, at least in part, collecting said light in a receiving device comprising a photoelectric element such that a signal is generated by the collected light,
causing a relative displacement between said support and said beam of light in a transverse direction with respect to the portion of the beam of light illuminating said object, said displacement being caused in a manner uncontrolled by other process parameters,
actuating at least one pulse generator by said relative displacement, said pulse generator delivering a number of electrical pulses proportional to the relative displacement amplitude,
and directing these pulses on to at least one pulse counter through an electronic gate opened and closed by the signal generated by said receiver device.

* * * * *